United States Patent [19]

Beekenkamp

[11] 4,084,803

[45] Apr. 18, 1978

[54] CLAMP AND CLAMPING ARRANGEMENT FOR HOLDING A WORKPIECE

[75] Inventor: Gerald Beekenkamp, Etobicoke, Canada

[73] Assignee: The Black and Decker Manufacturing Company, Towson, Md.

[21] Appl. No.: 713,644

[22] Filed: Aug. 12, 1976

[51] Int. Cl.[2] .......... B23Q 3/02

[52] U.S. Cl. .......... 269/91; 269/228

[58] Field of Search .......... 269/91-94, 269/99, 100, 228, 96

[56] References Cited

U.S. PATENT DOCUMENTS

| | | | |
|---|---|---|---|
| 737,527 | 8/1903 | Teilborg | 269/228 |
| 1,020,164 | 3/1912 | Symons | 269/228 |
| 3,578,307 | 5/1971 | Lock | 269/96 |

FOREIGN PATENT DOCUMENTS

| | | | |
|---|---|---|---|
| 278,666 | 11/1913 | Germany | 269/92 |

*Primary Examiner*—Robert C. Watson
*Attorney, Agent, or Firm*—Walter Ottesen; Edward D. Murphy; Leonard Bloom

[57] ABSTRACT

The invention is directed to a clamp for holding a workpiece to a work surface having an aperture formed therein. The clamp includes the main support arm having one end portion adapted for insertion into the aperture in the work surface. A clamping arm is pivotally connected to the main support arm above the above-mentioned end portion and the clamping arm defines a clamping surface for engaging the workpiece placed on the work surface. A first lever arm is pivotally connected to the main support arm and a second lever arm has one end pivotally connected to the first lever arm and another end pivotally connected to the clamping arm. Suitable structure is provided for applying a force to the pivot mutually connecting the first and second lever arms to cause the lever arms to transmit the respective forces to the main support arm and the clamping arm causing, in turn, the main support and the clamping arm to rotate with respect to each other so that the main support arm tightly engages the wall defining the aperture in the work surface and so that the clamping arm tightly engages the workpiece. The clamp also can be adapted to hold a workpiece to a workbench having no aperture therein. A clamping arrangement includes a member defining a work surface and having at least one aperture formed therein and the clamp. The clamp and member tightly hold the workpiece.

20 Claims, 12 Drawing Figures

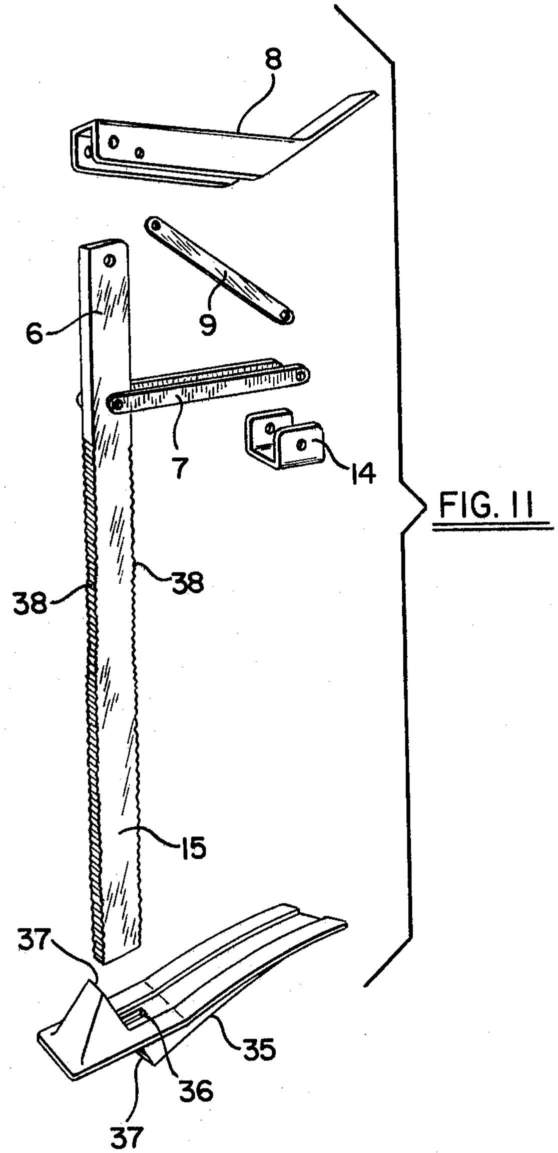
FIG. 11
FIG. 12
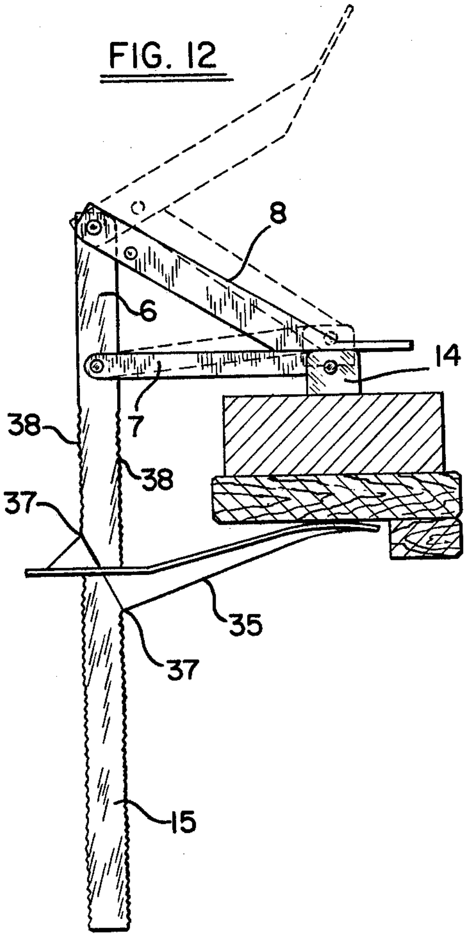

CLAMP AND CLAMPING ARRANGEMENT FOR HOLDING A WORKPIECE

BACKGROUND OF THE INVENTION

The invention relates to a clamp and clamping arrangement for holding a workpiece to a work surface.

The prior art is replete with clamps for holding a workpiece to a workbench of the type wherein a main support arm is inserted into an aperture formed in a workbench. Typical of the prior art, is a clamp disclosed in U.S. Pat. No. 299,776 wherein a cam actuated by a lever operates on an inclined surface to generate the pressure needed to hold a workpiece to a work surface. U.S. Pat. No. 102,487 discloses a similar device using a lever operated eccentric cam for developing the pressure of the clamp. Still another bench clamp is disclosed in U.S. Pat. No. 27,592 wherein the main support arm is placed in the aperture of a workbench. Here, a threaded member coacts with a pivoted lever arm to develop the pressure needed to hold the workpiece against the work surface.

The above prior art device all require members having complicated contours and are assembled of odd-shaped pieces which undoubtedly are difficult and expensive to manufacture.

SUMMARY OF THE INVENTION

Accordingly, it is an object of my invention to provide a clamp for clamping a workpiece to the surface of a workbench which can be assembled from pieces having a simple configuration and require no special shape.

It is another object of my invention to provide a clamp for clamping a workpiece to a work surface which self-locks when clamping the workpiece to the work surface.

It is still another object of my invention to provide a clamping arrangement wherein the clamp and an apertured member defining a work surface coact to tightly hold the workpiece.

The clamp according to the invention is suitable for holding a workpiece to a workbench having an aperture formed therein.

The clamp according to the invention includes a main support arm having an end portion adapted for insertion into the aperture of the work surface. The work surface can, for example, be defined by the bench board of a workbench. A clamping arm has an end pivotally connected to the main support arm above the above-mentioned end portion. The clamping arm defines a clamping surface for engaging the workpiece placed on the work surface. A first lever arm is pivotally connected to the main support arm and, a second lever arm has an end pivotally connected to the first lever arm and another end pivotally connected to the clamping arm. Means are provided for applying a force to the pivot mutually connecting the first and second lever arms to cause the lever arms to transmit respective forces to the main support arm and the clamping arm. These forces, in turn, cause the main support arm and the clamping arm to rotate with respect to each other so that the main support arm tightly engages the wall defining the aperture in the work surface and so that the clamping arm tightly engages the workpiece.

By applying the force to the pivot mutually connecting the first and second lever arms, the main support arm and the clamping arm are in effect stressed between the workpiece on the one hand, and the workbench on the other hand.

All the above arms of which the clamp is made up of can be configured as linear elongated members made for example of an extruded metal, such as steel or aluminum. The members could also be stamped from metal such as steel or made by a molding process of plastic material.

It is desirable that clamp be self-locking after the workpiece has been tightly engaged. Accordingly, it is another feature of the invention to include locking means for locking the first and second lever arms into position after the main support arm and clamping arm are rotated with respect to each other. With such locking means, the operator need not hold the clamp in the closed position or even perform a further step of tightening a locking device.

The arms of the clamp can be selected to have longitudinal dimensions so as to cause the interconnected portions of the arm to conjointly define a quadrilateral when the clamp is in the open condition and to conjointly define an outline approximating a triangle when the clamp is in the closed condition. The first lever is provided with a free end having a length sufficient to enable the first lever arm to be manually rotated to in turn rotate the second lever arm to cause the lever arms to simultaneously apply respective force to the main support arm and the clamping arm causing, in turn, the main support arm and the clamping arm to rotate with respect to each other so that the end portion of the main support arm tightly engages the wall defining the aperture of the bench board accommodating the main support arm and so that the clamping arm tightly engages the workpiece.

The pivot connecting the first lever arm to the main support arm and the pivot connecting the second lever to the clamping arm can be connected by an imaginary straight line. A locking means for locking the first and second levers can be provided by locating the pivot connecting said second lever arm to said first lever arm so as to cause the last-mentioned pivot to be beneath the above imaginary line when the clamp is in the closed condition. Structure means limits the movement of the pivot connecting the second lever arm to the first lever arm to a predetermined position beneath the imaginary line whereby the clamp is self-locked in the closed condition and the arms remain rigid in angular position with respect to each other to firmly hold the workpiece to the bench board until the clamp is opened.

To facilitate engaging the workpiece, a pressure pad can be pivotally mounted to the clamping arm at the pivot connecting the second lever arm to the clamping arm.

Where the apertures in the bench board of a workbench are rounded, and the main support arm of the clamp is rectangular in section, an annular bushing adapted for insertion into such an aperture can be provided. The bushing is preferably made of resilient material such as Nylon for example and configured to accommodate the end portion of the main support arm therein whereby mounting of the clamp in the bench board is facilitated.

The clamp according to the invention is especially suitable for use with the workbench of the kind described in the copending application Ser. No. 277,124 of Ronald Price Hickman filed Aug. 1, 1972 which is an improvement of his basic workbench disclosed in U.S. Pat. No. 3,615,087. The workbench disclosed in the above-mentioned patent application includes apertures provided for inserting a clamping tool and other accessories for facilitating work on a workpiece.

A workbench corresponding to the workbench disclosed in Patent 3,615,087 as modified according to the above-mentioned copending application is available in the United States and abroad and is sold by The Black and Decker Manufacturing Company of Towson, Md. as the "WORKMATE" all purpose work center and vise.

The clamping arrangement according to my invention includes as a feature a member defining a work surface and having at least one aperture formed therein; and, a clamp for holding the workpiece to said work surface. The member and clamp constitute a combination that coacts to tightly hold the workpiece. The member defining the work surface in my combination can be a workbench with at least one aperature formed therein.

According to still another embodiment of my invention, I provide a clamp equipped with an ancillary arm slideably mounted on the end portion of the main support arm. The ancillary arm enables the clamp to be used with a bench having no aperture formed therein.

The above objectives and advantages of my invention will become more apparent from a consideration of the detailed description to follow taken in conjunction with the drawing annexed hereto.

BRIEF DESCRIPTION OF THE DRAWING

FIG. 11 is an exploded view of the clamp according to still another embodiment of the invention suitable for use with the workbench having no apertures formed therein.

FIG. 12 is an elevation view of the clamp according to FIG. 11 showing the clamp closed and engaging a workpiece on a workbench. FIG. 12 also shows in phantom outline the position of the clamp arms when the clamp is in the open position.

DESCRIPTION OF THE PREFERRED EMBODIMENTS OF THE INVENTION

Figure 1:
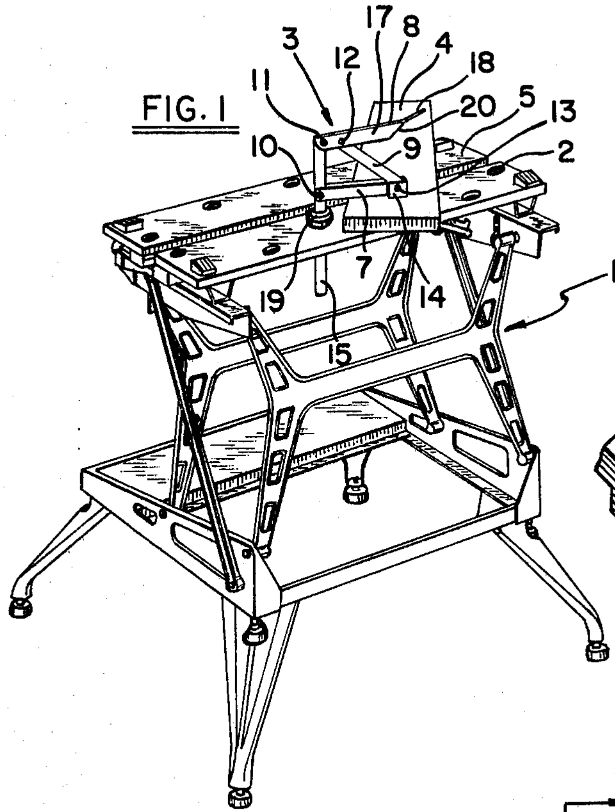
FIG. 1 illustrates the clamp according to my invention fitted in the aperture of the bench board of a workbench.

FIG. 1 is a schematic diagram of a workbench into which a clamp according to the invention has been inserted. The workbench 1 is provided with a plurality of apertures 2 which accommodate accessories such as the clamp according to the invention. The clamp 3 is shown in the open condition preparatory to clamping a workpiece 4 against the surface of one of the bench boards 5 of the workbench 1.

Figure 2:
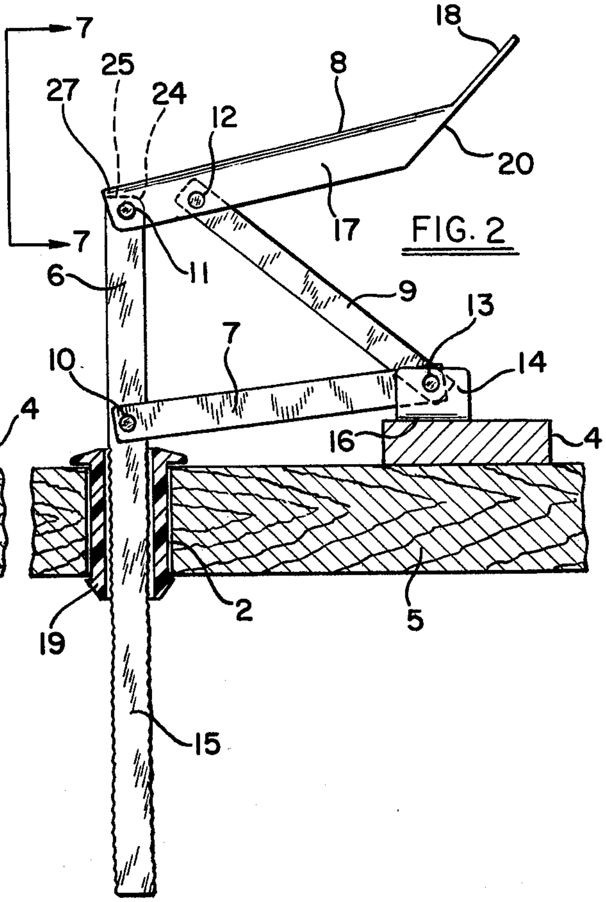
FIG. 2 is a schematic diagram illustrating the clamp in the open condition.

FIG. 2 shows the clamp 3 positioned in an aperture of the workbench 1 and in the open condition preparatory to clamping a workpiece 4. The clamp should be positioned in the aperture so that it contacts the workpiece before the clamp is closed.

The clamp 3 is made up of a main support arm 6 having an end portion 15 adapted for insertion into the aperture 2 of the bench board 5. The clamping arm 7 is pivotally connected to the main support arm 6 by pivot means in the form of pivot 10. The clamping arm 7 is provided with a clamping pad 14 for defining a clamping surface 16. The pad 14 is pivotally connected to the clamping arm 7 by means of a pivot 13. A first lever arm 8 is pivotally connected by pivot 11 to the upper end of the main support arm 6. A second lever arm is pivotally connected at one end to clamping arm 7 by pivot pin 13 and, at its other end, by pivot 12 to the first lever arm 8.

The first lever arm has a freely extending end portion 17 which can be rotated by the operator to move the clamp between its open and closed conditions. By grasping the end portion 17 at the flat-shaped handle portion 18 thereof, the operator achieves a maximum mechanical advantage about the fulcrum 11 for closing the clamp. A force is applied to the pivot 12 mutually connecting the first and second lever arms 8 and 9 to cause these lever arms to transmit respective forces to the main support arm 6 and the clamping arm 7. These forces cause, in turn, the main support arm 6 and the clamping arm 7 to rotate with respect to each other so that the main support arm tightly engages the inner wall of the bushing 19 and so that the clamping arm 7 tightly engages the workpiece 4 at the clamping surface 16.

Figure 3:
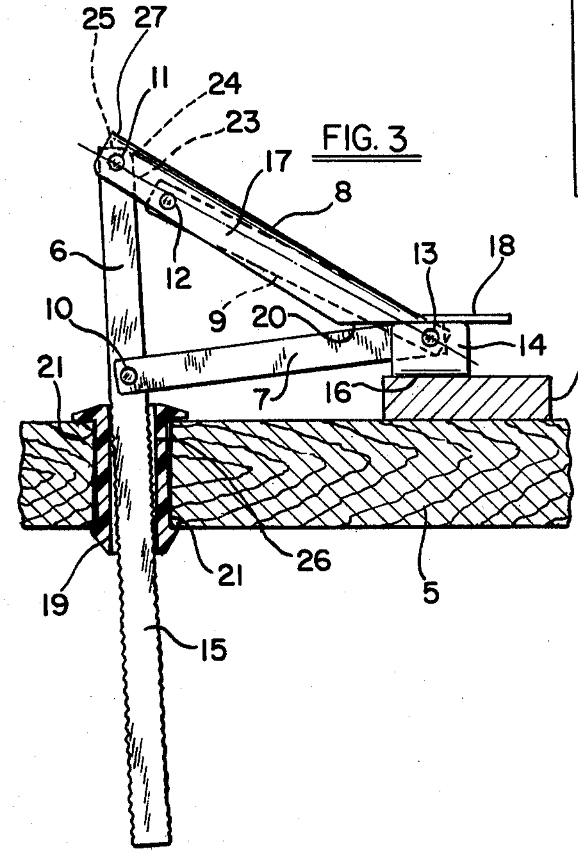
FIG. 3 is a schematic diagram of the clamp according to my invention shown in the closed condition. This view also shows how the clamp and apertured work surface coact according to the clamping arrangement according to my invention.

FIG. 3 shows the clamp in the closed condition wherein the end portion 15 tightly engages the wall of the aperture 2 through the bushing 19 at reference numerals 21. The bushing 19 is made of resilient material such as Nylon for example.

Figure 4:
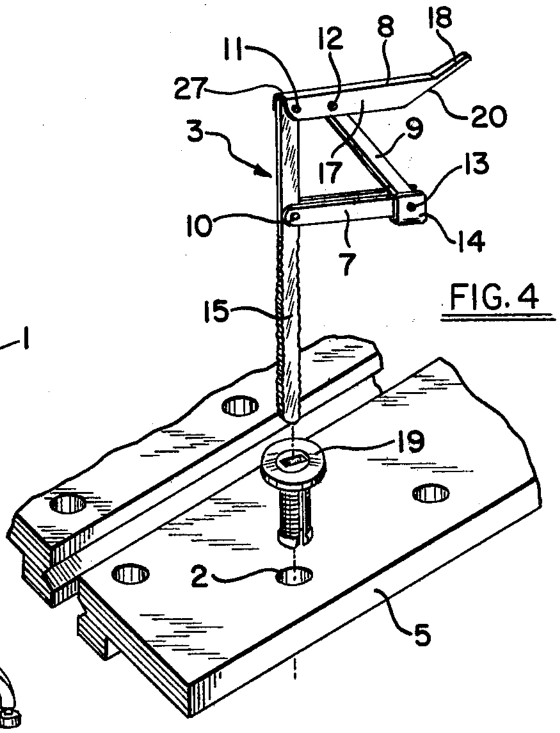
FIG. 4 shows how the clamp can be provided with a bushing adapted for insertion into one of the apertures of a workbench.

As more clearly shown in FIG. 4, the bushing 19 facilitates the insertion of the end portion 15 having a rectangular section into the rounded aperture 2. Further, when main support arm is placed under load by closing the clamp, the wall of the aperture is not marred because the resilient bushing protects the wood bench board 5.

Referring again to FIG. 2, the arms 6, 7, 8 and 9 can have longitudinal dimensions selected so as to cause the interconnected portions of these arms to conjointly define a quadrilateral when the clamp 3 is in the open condition and to conjointly define an outline approximating a triangle when the clamp 3 is in the closed condition (FIG. 3).

Appropriate locking means are provided for locking the clamp with the first and second levers occupying the positions shown in FIG. 3.

Figure 5:
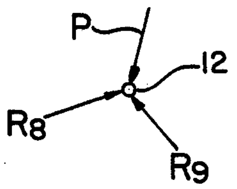
FIGS. 5 and 6 are free body diagrams of the pivot pin connecting the first and second lever arms together.

To examine the forces applied to the pivot pin 12, and to explain the self-locking feature of my invention, a free body diagram of the pin 12 is shown in FIG. 5 for the situation where the operator has partially closed the clamp and the pad 14 has already engaged the workpiece so that substantial forces are acting on the pin 12 as lever members 8 and 9 apply forces to the arms 6 and 7. For this condition, the interconnected members still define a quadrilateral wherein the arm 9 and the portion 22 of arm 8 conjointly define an inside acute angle. The downward force P is applied by the operator to overcome the reaction forces $R_8$ and $R_9$ transmitted to pivot pin 12 through the arms 8 and 9 as these arms apply loads to arms 6 and 7 respectively. Because the lever arms 8 and 9 are pin connected, the reaction forces $R_8$ and $R_9$ act along the longitudinal axes of these arms, respectively.

Figure 6:
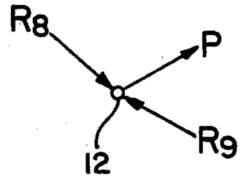

As the operator continues to apply load to pin 12, a point is reached where the above-mentioned acute inside angle becomes an obtuse inside angle as shown in FIG. 3. Referring to FIG. 6, the force P now applied by the operator to the pin 12 is in a generally upward direction because he, in effect, must try to overcome the reaction forces $R_8$ and $R_9$. The reaction forces $R_8$ and $R_9$ directed along lever arms 8 and 9, respectively, act in directions which would tend to make the obtuse inside angle larger; these reaction forces are caused by the bending stress loaded into the main support arm 6 as the clamp is closed.

Locking means can be provided by structure means which restrains the downward reaction forces $R_8$ and $R_9$ shown in FIG. 6. More specifically, the arm 8 can be configured so that it engages the arm 7 at the region of pin 13 to restrain a further downward movement of pin 12. Thus, the bending energy which was loaded into arm 6 during the downward movement of the arm 8 and which tends to urge pin 12 downward once the above-mentioned inside acute angle becomes an inside obtuse angle, is utilized to keep the clamp locked tight by pulling downwardly on arm 8, which, in turn, is held in a fixed position once the arm 8 engages arm 7 at the region of pin 13.

In the locked condition of the clamp 3, the interconnected arms making up the clamp approximate a triangle. As shown in FIG. 3, an imaginary line 23 is drawn through pins 11 and 13 and the pin 12 lies below this line when the clamp is in the closed, locked condition. By locating the pin 12 on lever arm 8 so that it lies below this imaginary line when the clamp is in the closed condition, a resultant thrust into the triangle is achieved for the closed condition which keeps the clamp locked when the end portion 20 of the first lever arm 8 abuts against the clamping arm 7 to prevent collapse of the triangle.

Of course, if desired, the locking means can be constituted by other structure means which operates to prevent further movement of the interconnected arms making up the clamp so that the bending energy stored in main support arm 6 will remain to cause the clamp to act on the bench board and workpiece 4 to hold the latter tight against the bench board.

As mentioned above, the bushing 19 is preferably made of resilient material which is preferably Nylon. However, other materials such as hard rubber and the like are also suitable. It should be noted that the bushing 19 is not essential to the basic concept of the invetion since the holding force is developed by the bending stress loaded into the main support arm when the clamp is closed.

To achieve a better gripping surface, it is desirable to texture the surfaces of the end portion 15 of the main support arm 6 where it tightly engages the bushing 19 or the inner wall of the aperture 2 in the event no bushing is utilized. Likewise, the outer wall of the bushing can also be textured to improve its gripping capability.

When mounting the clamp according to the invention on the workbench, the bushing 19 is first inserted into an aperture 2 thereof and, thereafter, the main support arm 6 is inserted into the opening 26 within the bushing 19 for accommodating the lower portion 15 of the arm 6. In this way, the bushing 19 is caused to spread out and entirely fill the aperture 2 thereby contributing to a snug fit of the clamp and bushing in the workbench before the clamp is closed.

As mentioned, when placing the clamp in the workbench, the clamp is inserted into the bushing 19. It should be noted however, that the main support arm 6 is lowered into the bushing 19 until the clamping surface 16 of pad 14 engages the workpiece 4 while the clamp is still in the open condition. The clamp is then closed by moving lever 8 from the position shown in FIG. 2 to the position shown in FIG. 3.

It has been found that when the arms 6, 7, 8 and 9 occupy the position relative to each other shown in FIG. 2 and with the main support arm 6 lowered so that pad 14 is in contact with the workpiece 4, adequate pressure to securely hold the workpiece 4 against the bench board 5 is obtained when the clamp is closed.

Figure 7:
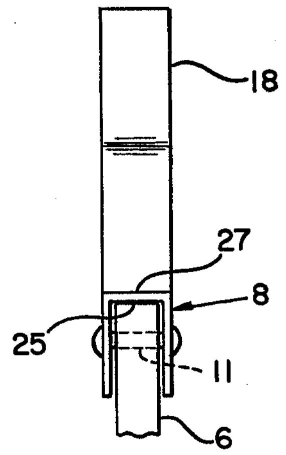
FIG. 7 is a partial, exploded end view showing how the movement of the lever arm pivotally connected to the upper end of the main support arm of the clamp is limited in the open condition of the clamp.

To ensure that the arms 6, 7, 8 and 9 of the clamp take on the position relate to each other shown in FIG. 2 for the clamp in the open condition, the lever 8 is configured as a channel having a base portion 27 as shown in FIG. 7. In addition, the upper end of main support arm 6 is configured to have a square edge 25 extending transverse to the lever 8 and a rounded portion 24. The lever 8 is connected to arm 6 by pin 11 in such a manner that the rounded portion 24 faces inwardly to the base portion 27 of lever 8 so that sufficient clearance is provided to permit downward rotation of lever 8. When the clamp is in the open position, the edge portion 25 coacts with base portion 27 as shown in FIG. 7 to limit and stop the upward movement of the lever 8 at the position shown in FIG. 2. The edge portion 25 and the base portion 27 thus constitute limit means for limiting the angular movement of the lever arm 8 when the lever arm 8 is rotated to bring the clamp from its closed condition to its open condition. It has been found that the movement of lever 8 through the excursion represented by the respective positions of lever 8 in FIGS. 2 and 3 and the rotation of the other arms of the clamp corresponding to this movement insures that there will be sufficient pressure for holding the workpiece 4 to the bench board 5. Thus, by first inserting the arm 6 into the workbench until the pad 14 engages the workpiece 4, and then closing the clamp by moving the lever arm 8 through the arc between the positions shown in respective FIGS. 2 and 3, sufficient pressure is developed by the clamp to adequately secure the workpiece 4.

Figure 8:
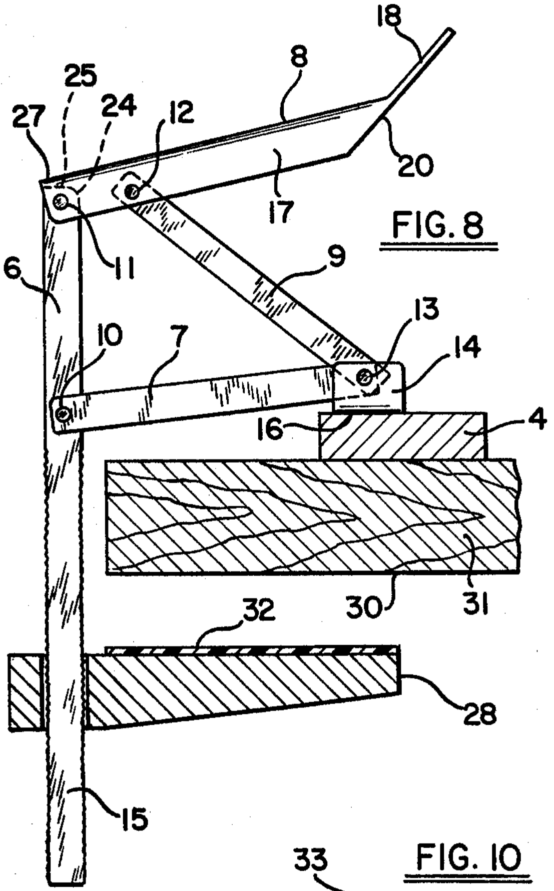
FIG. 8 illustrates the clamp according to another embodiment of the invention suitable for use with a workbench having no apertures formed therein.
Figure 9:
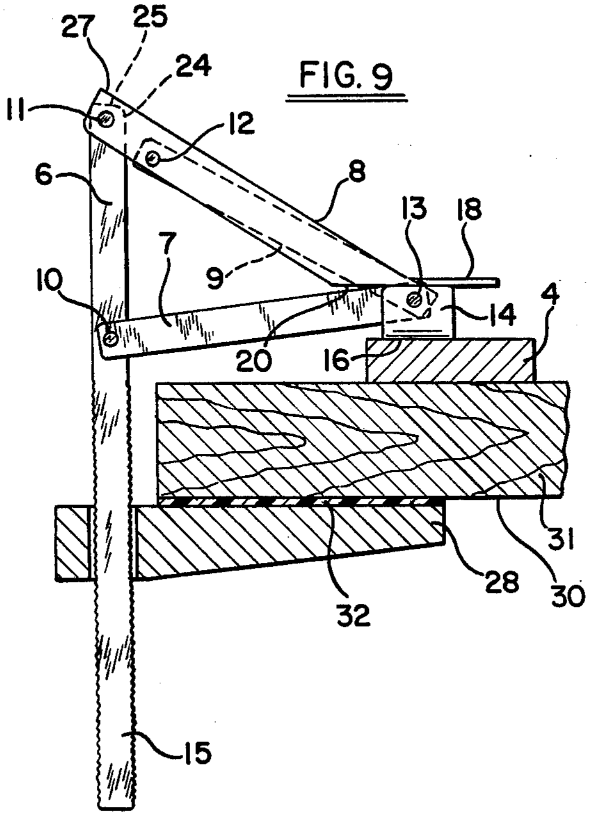
FIG. 9 shows the clamp of FIG. 7 in the closed position.
Figure 10:
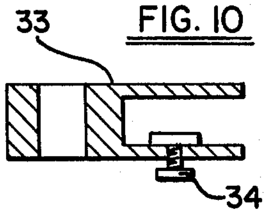
FIG. 10 illustrates an ancillary arm for the clamp in FIGS. 8 and 9 provided with mounting means for tightly securing the arm to a flat member such as the bench board of a workbench.

It is of course possible to adapt the clamp according to the invention for use with the workbench which has no apertures formed therein. Referring now to FIGS. 8 and 9, the clamp according to the invention can include an ancillary arm 28 having an opening formed therein for slideably engaging the lower portion 15 of the main support arm 6. The clamp and its ancillary arm 28 are positioned so that the arm 28 can be positioned to engage the lower surface 30 of the workbench 31. With the clamp in the open position as shown in FIG. 8 and touching the workpiece 4 with its pad 14, the ancillary arm 28 is moved upwardly along the lower portion 15 of the main support arm 6 until the arm 28 is in contact with the lower surface 30 of the workbench 31. The clamp is then closed as shown in FIG. 9 to firmly hold the workpiece 4 to the workbench. The pad 32 extending the full length of the ancillary arm 28 provides added stability because it takes up any irregularities in the lower surface 30 of the workbench. The pad 32 can be made, for example. of Neoprene rubber and the arm 28 itself can be a steel Or aluminum casting or a steel stamping As shown in FIG. 10, the arm 33 can be configured in the form of a C-clamp and be provided with suitable mounting means for tightly securing the arm to the workbench. The mounting means can include a threaded member 34 threadably engaging the arm 33 as shown in FIG. 10. The threaded member 34 can be tightened against the underside of the workbench to hold the arm 33 thereon.

FIG. 11 illustrates still another embodiment of the invention wherein the clamp is suitable for use with a workbench which has no apertures formed therein. The clamp is provided with an ancillary arm 35. The other members of the clamp are as shown, for example, in FIGS. 2, 3 and 7. The ancillary arm 35 slideably engages the lower end portion 15 of the clamp in an opening 36 formed in the ancillary arm 35. Edge means 37 are formed on the ancillary arm and serrated edge means 38 are formed on the edges of the lower end portion 15.

In FIG. 12 the phantom outline shows the clamp in the open position; whereas, the solid outline illustrates the clamp in the closed position. When the clamp is closed, the serrated edge means 38 formed on the end portion 15 of the main support arm 6 are tightly engaged by the edge means 37 formed on the ancillary arm 35.

I claim:

1. A clamp for holding a workpiece to a work surface having an aperture formed therein comprising:

a main support arm having an end portion adapted for insertion into the aperture in the work surface;

a clamping arm having an end pivotally connected to said main support arm above said end portion;

a first lever arm pivotally connected to said main support arm;

a second lever arm having one end pivotally connected to said first lever arm and having another end pivotally connected to said clamping arm at a pivot location on said clamping arm spaced from said end of said clamping arm whereat said clamping arm is pivotally connected to said main support arm;

means for applying a force to the pivot mutually connecting said first and second lever arms to cause said lever arms to transmit respective forces to said main support arm and said clamping arm causing, in turn, said main support arm and said clamping arm to rotate with respect to each other so that said main support arm tightly engages the wall defining the aperture in the work surface and so that said clamping arm tightly engages the workpiece; and, clamping means mounted on said clamping arm at said pivot location for engaging a workpiece placed on the work surface whereby the forces transmitted along said second lever and said clamping arm act directly at said clamping means when the workpiece is tightly engaged by the clamp.

2. The clamp of claim 1 comprising: Locking means for locking said first and second lever arms into position after rotating said main support arm and said clamping arm with respect to each other.

3. A clamp for holding a workpiece to a work surface having an aperture formed therein comprising;

a linear elongated main support arm having an end portion adapted for insertion into the opening in the work surface;

a linear elongated clamping arm having an end pivotally connected to said main support arm above said end portion;

a first linear elongated lever arm;

first pivot means for pivotally connecting said first lever arm to said main support arm;

a second linear elongated lever arm;

second pivot means for pivotally connecting said second lever arm to said clamping arm;

third pivot means for connecting said lever arms to each other;

means for rotating said first linear elongated lever arm about said first pivot means in one angular direction and for rotating said second linear elongated lever arm about said second pivot means in an angular direction opposite to said one angular direction to apply respective forces to said first and second pivot means so as to cause said main support arm and said clamping arm to rotate with respect to each other so that said main support arm tightly engages the wall defining the aperture in the work surface and so that said clamping arm tightly engages the workpiece; and, clamping means mounted on said clamping arm at said second pivot means for engaging a workpiece placed on the work surface whereby the forces transmitted along said second lever arm and said clamping arm act directly at said clamping means when the workpiece is tightly engaged by the clamp.

4. The clamp of claim 3 comprising: locking means for locking said first and second lever arms into position after rotating said main support arm and said clamping arm with respect to each other.

5. A clamp for holding a workpiece to a work surface having an opening formed therein comprising:

a main support arm having an end portion adapted for insertion into the opening in the work surface;

a clamping arm having an end pivotally connected to said main support arm above said end portion;

a first lever arm having one end thereof pivotally connected to said main support arm so as to be rotatable between first and second positions corresponding to the open and closed conditions of the clamp, respectively; and, a second lever arm having one end thereof pivotally connected to said clamping arm, one of said lever arms being pivotally connected at its other end to the other one of said lever arms at a location on said other lever arm spaced from the ends of said other lever arm so as to cause the other end of said other lever arm to freely extend beyond said location;

said free end of said other lever arm having a length sufficient to enable said other lever arm to be manually rotated to, in turn, rotate said one lever arm so as to cause said lever arms to simultaneously apply respective forces to said main support arm and said clamping arm causing, in turn, said main support arm and said clamping arm to rotate with respect to each other so that said main support arm tightly engages the wall defining the opening in the work surface and so that said clamping arm tightly engages the workpiece; and, clamping means for engaging a workpiece placed on the work surface, said clamping means being mounted on said clamping arm whereat said second lever arm is pivotally connected to said clamping arm whereby the forces transmitted along said second lever arm and said clamping arm act directly at said clamping means when the workpiece is tightly engaged by the clamp.

6. The clamp of claim 5 comprising: limit means for limiting the angular movement of said first lever arm to prevent a further angular rotation thereof beyond said first position when the clamp is brought from said closed condition into said open condition.

7. The clamp of claim 5 comprising: locking means for locking said first and second lever arms into position after rotating said main support arm and said clamping arm with respect to each other.

8. The clamp of claim 7 comprising: limit means for limiting the angular movement of said first lever arm to prevent a further angular rotation thereof beyond said first position when the clamp is brought from said closed condition into said open condition.

9. A clamp for holding a workpiece to a work bench having a bench board with at least one aperture formed therein comprising:

a main support arm having an end portion adapted for insertion into the aperture in the bench board;

a clamping arm having an end pivotally connected to said main support arm above said end portion;

a first lever arm pivotally having one end thereof pivotally connected to said main support arm so as to be rotatable between first and second positions corresponding to the open and closed conditions of the clamp, respectively, a second lever arm having one end thereof pivotally connected to said clamping arm, said second lever arm being pivotally connected at its other end to said first lever arm at a location on said first lever arm spaced from the ends of said first lever arm so as to cause the other end of said first lever arm to freely extend beyond said location;

said arms having longitudinal dimensions selected so as to cause the interconnected portions of said arms to conjointly define a quadrilateral when the clamp is in the open condition and to conjointly define an outline approximating a triangle in said closed condition;

said free end of said first lever arm having a length sufficient to enable said first lever arm to be manually rotated to, in turn, rotate said second lever so as to cause said lever arms to simultaneously apply respective forces to said main support arm and said clamping arm causing, in turn, said main support arm and said clamping arm to rotate with respect to each other so that said end portion of said main support arm tightly engages the wall defining the aperture in the bench board accommodating said main support arm and so that said clamping arm tightly engages the workpiece;

locking means for locking said first and second levers after said main support arm and said clamping arm are rotated with respect to each other; and, clamping means for engaging a workpiece placed on the bench board of the work bench, said clamping means being mounted on said clamping arm whereat said second lever arm is pivotally connected to said clamping arm whereby the forces transmitted along said second lever arm and said clamping arm act directly at said clamping means when the workpiece is tightly engaged by the clamp.

10. The clamp of claim 9 comprising: limit means for limiting the angular movement of said first lever arm to prevent a further angular rotation thereof beyond said first position when the clamp is brought from said closed condition into said open condition.

11. The clamp of claim 9 wherein the pivot connecting said first lever arm to said main support arm and the pivot connecting said second lever to said clamping arm can be connected by an imaginary straight line, said locking means including locating the pivot connecting said second lever arm to said first lever arm so as to cause said last-mentioned pivot to be beneath said imaginary line when the clamp is in said closed condition, and, structure means for limiting the movement of said pivot connecting said second lever arm to said first lever arm to a predetermined position beneath said imaginary line whereby the clamp is self-locked in said closed condition and said arms remain rigid in angular position with respect to each other to firmly hold the workpiece to the bench board until the clamp is opened.

12. The clamp of claim 11 comprising: limit means for limiting the angular movement of said first lever arm to prevent a further angular rotation thereof beyond said first position when the clamp is brought from said closed condition into said open condition.

13. The clamp of claim 11 comprising: a pressure pad for engaging the workpiece to be clamped, said pressure pad being pivotally mounted to said clamping arm at the pivot connecting said second lever arm to said clamping arm.

14. The clamp of claim 11 wherein the aperture in the bench board is rounded and the main support arm has a rectangular section, the clamp further comprising an annular bushing adapted for insertion into said aperture, said bushing being made of resilient material and configured for accommodating said end portion of said main support arm therein whereby mounting of the clamp in the bench board is facilitated.

15. The clamp of claim 14 comprising a pressure pad for engaging the workpiece to be clamped, said pressure pad being pivotally mounted to said clamping arm at the pivot connecting said second lever arm to said clamping arm.

16. The clamp of claim 14, said end portion of said main support arm having two sides which tightly engage said bushing when the clamp is in the closed condition, said bushing having an outer surface for engaging the wall defining the aperture when inserted therein, said two sides and said outer surface being textured to afford an improved engaging surface.

17. The clamp of claim 16, said resilient material being Nylon.

18. A clamp for holding a workpiece to a work bench having an aperture formed therein comprising:

a main support arm having an end portion adapted for insertion into the aperture in the workbench;

a clamping arm;

first pivot means for connecting said clamping arm to said main support arm above said end portion;

a first lever arm;

second pivot means for pivotally connecting said first lever arm to said main support arm;

a second lever arm;

third pivot means or pivotally connecting said second lever arm to said clamping arm;

fourth pivot means for connecting said lever arms to each other, said fourth pivot means being located on one of said lever arms spaced from the ends thereof so as to cause said one lever arm to have an end portion extending freely beyond said fourth pivot means;

said arms having longitudinal dimensions selected so as to cause the interconnected portions of said arms between said pivot means to conjointly define a quadrilateral with said first and second lever arms conjointly defining an acute inside angle when the clamp is in the open condition and to cause said interconnected portions to conjointly define a quadrilateral with said first and second lever arms conjointly defining an obtuse inside angle when the clamp is in the closed condition;

said free end portion of said one lever arm having a length sufficient to enable said one lever arm to be manually rotated about said second pivot means to, in turn, rotate the other one of said lever arms to bring said lever arms into respective positions wherein they conjointly define said obtuse inside angle thereby causing said lever arms to simultaneously apply respective forces to said main support arm and said clamping arm causing, in turn, said main support arm and said clamping arm to rotate with respect to each other so that said end portion of said main support arm tightly engages the wall defining the aperture in the workbench accommodating said main support arm and so that said clamping arm tightly engages the workpiece;

locking means for locking said first and second levers into said positions defining said obtuse inside angle after rotating said main support arm and said clamping arm with respect to each other; and, clamping means mounted on said clamping arm at said third pivot means for engaging a workpiece placed on the work bench whereby the force transmitted along said second lever arm and said clamping arm act directly at said clamping means when the workpiece is tightly clamped by the clamp.

19. The clamp of claim 18, said locking means being structure means for limiting the movement of said fourth pivot means to a predetermined position after said acute inside angle becomes said obtuse inside angle whereby the clamp is self-locked in said closed condition and said arms remain rigid in angular position with respect to each other to firmly hold the workpiece to the bench board until the clamp is opened.

20. The clamp of claim 18 comprising: limit means or limiting the angular movement of said first lever arm to prevent a further angular rotation thereof beyond said first position when the clamp is brought from said closed condition into said open condition.

* * * * *